(12) United States Patent
Eymard et al.

(10) Patent No.: US 8,004,607 B2
(45) Date of Patent: Aug. 23, 2011

(54) REGION-BASED CADENCE DETECTOR

(75) Inventors: Frankie Eymard, Sassenage (FR);
Christophe Barnichon, Sassenage (FR)

(73) Assignee: STMicroelectronics S.A., Montrouge (FR)

( * ) Notice: Subject to any disclaimer, the term of this patent is extended or adjusted under 35 U.S.C. 154(b) by 1113 days.

(21) Appl. No.: 11/758,637

(22) Filed: Jun. 5, 2007

(65) Prior Publication Data

US 2007/0291169 A1      Dec. 20, 2007

(30) Foreign Application Priority Data

Jun. 6, 2006   (FR) ...................................... 06 05027

(51) Int. Cl.
*H04N 7/01*       (2006.01)
*H04N 11/20*    (2006.01)

(52) U.S. Cl. .......... 348/452; 348/448; 348/441; 348/97; 348/701

(58) Field of Classification Search .................. 348/452, 348/448, 441, 97, 701
See application file for complete search history.

(56) References Cited

U.S. PATENT DOCUMENTS

| | | | |
|---|---|---|---|
| 5,828,786 A | 10/1998 | Rao et al. | |
| 6,031,927 A | 2/2000 | Rao et al. | |
| 6,040,875 A * | 3/2000 | Boice et al. | 348/595 |
| 6,055,018 A | 4/2000 | Swan | |
| 6,480,232 B1 | 11/2002 | Wilson | |
| 6,542,199 B1 * | 4/2003 | Manbeck et al. | 348/459 |
| 6,940,557 B2 * | 9/2005 | Handjojo et al. | 348/452 |
| 7,075,581 B1 | 7/2006 | Ozgen et al. | |
| 7,129,990 B2 | 10/2006 | Wredenhagen et al. | |
| 7,203,238 B2 | 4/2007 | Liu et al. | |
| 7,349,029 B1 | 3/2008 | Chou | |
| 7,391,468 B2 | 6/2008 | Shah | |
| 7,405,766 B1 | 7/2008 | Chou et al. | |
| 7,528,887 B2 | 5/2009 | Wyman | |
| 7,561,206 B2 | 7/2009 | Munsil et al. | |
| 7,605,866 B2 | 10/2009 | Conklin | |
| 7,612,828 B2 | 11/2009 | Winger et al. | |

(Continued)

FOREIGN PATENT DOCUMENTS

EP          0720366          7/1996

(Continued)

OTHER PUBLICATIONS

Preliminary French Search Report, FR. 0605027, dated Apr. 24, 2007.

*Primary Examiner* — David Gray
*Assistant Examiner* — Mustafizur Rahman
(74) *Attorney, Agent, or Firm* — Gardere Wynne Sewell LLP

(57) ABSTRACT

In a method for detecting the cadence of a sequence of images, each pixel in each current field in the sequence of images is compared to at least one pixel in at least one previous field. A pixel motion phase value is assigned to each pixel in the field as a function of the result of that comparison. For each block of pixels in the current field, a block motion phase value is determined from the motion phase values of the pixels in the block. The current field is segmented into at least one region, with each region comprising a whole number of blocks, as a function of at least the determined block motion phase values. A region motion phase value is assigned to each region, based on the block motion phase values for the blocks in the region.

17 Claims, 11 Drawing Sheets

U.S. PATENT DOCUMENTS

| | | |
|---|---|---|
| 7,800,692 B2 | 9/2010 | Wredenhagen et al. |
| 7,808,552 B1 | 10/2010 | Wang et al. |
| 1,001,308 A1 | 1/2011 | Wredenhagen at al. |
| 2002/0135697 A1 | 9/2002 | Wredenhagen et al. |
| 2002/0171759 A1* | 11/2002 | Handjojo et al. .............. 348/452 |
| 2005/0162547 A1 | 7/2005 | Kuroda et al. |
| 2005/0168652 A1 | 8/2005 | Wyman |
| 2005/0168653 A1 | 8/2005 | Wyman |
| 2006/0146187 A1* | 7/2006 | Handjojo et al. .............. 348/448 |
| 2006/0187341 A1 | 8/2006 | Fuji |
| 2007/0002169 A1 | 1/2007 | Munsil et al. |
| 2007/0052846 A1 | 3/2007 | Adams |
| 2007/0139552 A1 | 6/2007 | Jia et al. |
| 2007/0188662 A1 | 8/2007 | Winger et al. |
| 2007/0258014 A1 | 11/2007 | Doswald |
| 2007/0291169 A1 | 12/2007 | Eymard et al. |
| 2008/0002055 A1* | 1/2008 | Caviedes et al. .............. 348/452 |
| 2008/0158414 A1 | 7/2008 | Capps |

FOREIGN PATENT DOCUMENTS

| | | |
|---|---|---|
| EP | 1592250 | 11/2005 |
| WO | WO-91/06182 | 5/1991 |

* cited by examiner

REGION-BASED CADENCE DETECTOR

PRIORITY CLAIM

The present application is a translation of and claims priority from French Patent Application No. 06 05027 of the same title filed Jun. 6, 2006, the disclosure of which is hereby incorporated by reference to the maximum extent allowable by law.

BACKGROUND OF THE INVENTION

1. Technical Field of the Invention

The present invention relates to detecting the cadence of a sequence of images.

2. Description of Related Art

The detection of the cadence of a sequence of images is based on a search for a cadence pattern, for example "10010", in a sequence of bits representative of the motion between one field and another. Cadence is therefore understood to mean a successive repetition of at least one cadence pattern.

Cadence detection may lead to determining the source format of an image sequence, or detecting the absence of motion (still pictures). Several source formats exist. For example, a video camera may capture 50 or 60 frames per second. In film format, filmed images are captured at a rate of 24 or 25 frames per second. The number of frames per second may be even smaller, for example about 8 frames per second for certain Japanese animation.

There are also multiple display formats. The PAL standard (Phase Alternating Line), primarily used in Europe, specifies the display of 50 fields per second. The NTSC format (National Television Standards Committee), primarily used in the United States, specifies the display of 60 fields per second.

The standards commonly used in television specify encoding the source frames into successive interlaced fields (half a frame), where fields containing the even lines of pixels in a given frame for display are interlaced, or in other words they alternate, with fields containing only the odd lines of pixels in a next frame for display.

More generally, an image is subdivided into one field, two fields, or even more fields, depending on the scanning mode. In this document, the term "field" therefore covers a complete image, half of an image, and even smaller fractions of an image.

Thus, when a sequence of video frames at 50 frames per second is encoded in the PAL standard, each frame is reduced to a field of half a frame, of alternating parity. In another example, when a sequence of frames in film format at 25 frames per second is encoded in the PAL format at 50 Hz, each film frame is subdivided into two interlaced fields. In another example, when a sequence of frames in film format at 24 frames per second is encoded in the NTSC format at 60 fields per second, each sequence of four consecutive film frames is converted into a sequence of ten fields of half a frame. In these ten fields, the first three originate, for example, from the same film frame, the next two fields originate from a second film frame, etc. Thus, two of the first three fields are identical. Such a conversion is called a 3:2 pulldown.

Other types of conversion also exist. There is the 2:2 pulldown which converts a film format of 24 or 25 frames per second to the PAL format at 50 Hz, the 2:3 pulldown which converts a 24 frames per second format to an NTSC format, the 3:2:3:2:2 pulldown when a television station eliminates one field out of twelve in a sequence originating from film frames, 2:2:2:4 and 2:3:3:2 conversions for frames captured in a DVCAM format, 5:5, 6:4 or 8:7 conversions for frames of animated cartoons, etc.

Cadence detection is based on comparisons of pixels belonging to successive fields of index n, performed in order to determine the existence of motion between one field and another. A conversion typically leads to abrupt variations in motion. For example, in a 3:2 pulldown, three fields n−3, n−2, n−1, originate from the same film frame, and essentially no motion is detected between these fields. The next two fields n, n+1 originate from another film frame. Relatively substantial motion may be detected between the third field n−1 and the fourth field n, while the motion between the fourth field n and the fifth field n+1 is essentially zero. By analyzing a sequence of bits representative of the motion, called a motion sequence, determined by comparisons of pixels in a field sequence, one may identify a repeating pattern and thus detect that a conversion has been performed. Cadence detection is therefore based on a motion sequence analysis.

For a sequence of fields of half a frame, these comparisons between pixels may, for example, involve calculations of the median. The comparisons may be made between pixels in two successive fields, n−1, n, normally of opposite parity. One may also compare the pixels of a field n with pixels in the previous field of the same parity n−2, etc.

For a sequence of fields which are complete frames, each pixel is present from one field to the next and pixel comparisons are relatively simple.

Cadence detection may be used in a variety of applications. For example, a cadence detector may be coupled with a deinterlacing device. A deinterlacing device is used to reconstruct the corresponding image from a field of half an image. Encoding into interlaced format reduces the amount of information to be sent by a factor of two. This decrease occurs to the detriment of the image quality, and is even more evident when animated images are concerned.

For video, the frame represented by a first field n−1 is not quite the same as the one represented by the next field n, because they are separated by an interval of time and the objects represented are in motion. Therefore, a frame is not reconstructed from a sequence of images in interlaced video format by simply overlaying two successive fields. Deinterlacing algorithms must be applied, such as spatial interpolation or temporal interpolation with motion compensation.

In film format with 25 frames per second, each film frame is subdivided into two fields when encoding to the interlaced format of 50 fields per second. The reconstruction of a frame sequence from a sequence of interlaced fields may then be done simply by merging two successive fields initially corresponding to the same film frame.

It may therefore be of interest, before applying a deinterlacing algorithm, to detect whether a sequence of interlaced fields originates from a film format. If such is the case, the sequence of film frames may be identically reconstructed simply by merging the fields.

In addition, cadence detection allows for avoiding the application of complex deinterlacing algorithms to a sequence of interlaced fields originating from a film format. In the case described above of a field sequence resulting from a 3:2 pulldown, the motion between the third field n−1 and the fourth field n corresponds to the motion between two frames separated by $1/24^{th}$ of a second, i.e. a relatively long interval of time. The motion between the fourth field n and the fifth field n+1 should essentially be zero, because these fields come from the same frame. Considering these abrupt variations in motion from one field to another, a deinterlacing algorithm with motion compensation could result in artifacts during the reconstruction.

More generally, detecting the cadence of a sequence of images may permit a simpler deinterlacing of higher quality.

In another example, a cadence detector may be used for compression. For example, if a field sequence at 60 Hz results from a 3:2 pulldown, each sequence of five fields contains the same field twice. In other words, one field out of five may be removed without losing any information. A flag may be set to signal such a removal. In another example, if no motion is detected in several successive fields, all these successive fields may be eliminated except two fields of opposite parity without losing any information. Analysis of the motion sequence may thus contribute to a relatively efficient compression.

However, a displayed image may be created from several combined sources. This is the case when subtitles are overlaid onto a sequence of film frames, or when an image is partitioned in order to highlight specific areas, for example variations in stock prices or graphs. The fields of a given sequence may therefore comprise zones emanating from different sources, for example a film zone which has undergone a 3:2 pulldown and a video zone directly captured at 60 frames per second.

In addition, certain compression algorithms apply encoding such that a 2:2 conversion may be locally introduced. For example, the DV (Digital Video) compression algorithm may encode certain areas on the basis of corresponding parts of fields of half a frame, while other areas are encoded on the basis of corresponding parts of frames.

To perform cadence detection in such combinations, it is known to break up the fields into blocks, and to look for motion in each block in order to perform the cadence detection locally. For each block, pixels in a current field are compared with pixels in a previous field, and possibly in a next field. These comparisons result in determining for each pixel a pixel motion phase value representative of the motion for the pixel. Then, for each block, the pixel motion phase values for the pixels in the block are used to decide on a block motion phase value for the block. By storing the block motion phase values for the block from one field to the next, a motion history for the block is maintained. Searching for a pattern in this history may result in detecting a conversion. For each block, depending on the application desired, parameters may be sent to a processing device such as a deinterlacing device, or to a means of compression.

The blocks may, for example, have a size of 16×16 pixels in a displayed image. Thus, a screen of 720×576 pixels corresponds to 1620 blocks. For each field, 1620 transmissions of parameters therefore occur.

Patent application WO 02/056597, the disclosure of which is hereby incorporated by reference, describes a method in which objects are identified in multiple images. An object may be defined in that the pixels in this object move in these images according to the same motion model. Cadence detection is performed and a decision is made for each object identified.

SUMMARY OF THE INVENTION

Embodiments disclosed herein allow for reducing the number of transmissions to the processing device, in a relatively simple manner.

In a first aspect, a method for detecting the cadence of a sequence of images is presented. For each current field in the sequence of images, each pixel in a group of pixels in the current field is compared to at least one pixel in at least one previous field. Each pixel in the group of pixels in the current field is assigned a pixel motion phase value as a function of the result of said at least one comparison. For each block of pixels in a group of blocks in the current field, a block motion phase value is determined from the motion phase values of the pixels in the block. The current field is segmented into at least one region, with each region comprising a whole number of blocks, as a function of at least the determined block motion phase values. A region motion phase value is assigned to each region based on the block motion phase values for the blocks in this region.

Thus, the data obtained based on at least a part of the at least one assigned region motion phase value may be sent to a processing device. For each region obtained, or for a part of the regions obtained, for example only a possible region for which a film conversion has been detected, a region motion phase value, or one or more parameters obtained based on the region motion phase value, may be sent for processing, for example deinterlacing. The process limits the number of transmissions to one transmission per region, and not per block of pixels as in the prior art.

Block motion phase values are used to segment the current field into regions. The segmentation is thus relatively simple to implement.

The embodiments are not limited by the nature of the fields. For a processing device comprising a deinterlacing device, each field corresponds to half a frame. For a processing device comprising a compression device, each field may correspond to a complete frame.

Conventionally, the method is applied to all pixels and all blocks in the current field, meaning the group of pixels and the group of blocks respectively comprise all pixels and all blocks in the current field. However, the pixel motion phase value assignment steps and block motion phase value determination steps may respectively be applied only to certain pixels and blocks in the current field.

Conventionally, this method is applied to each field in the sequence. It may, however, be applied only periodically, at a frequency of one field out of ten for example, or only certain steps of it be applied periodically, such as segmentation.

A region may comprise one or more blocks, and may even comprise no blocks.

For simplicity, the phrases "pixel motion phase", "block motion phase", and "region motion phase" will respectively be used to indicate the values of the pixel, block, and region motion phases.

Segmentation may, for example, be done based on block motion phases only. Segmentation may, for example, result in outlining the region contours, with each region comprising at least a given proportion of blocks having the same motion phase. This motion phase is assigned to the region as a region motion phase. One may send to a processing device only the region motion phases, and for each region, an indication of the blocks in the region, for example the region contour.

However, the segmentation step is advantageously performed by using at least one region obtained during the segmentation done in a previous field. For simplicity, we will say that the segmentation step is performed as a function of a segmentation performed in a previous field, called a previous segmentation. Thus, the regions may vary relatively little from one field to the next, as the recursive character of the segmentation allows greater stability. In addition, this may further reduce the volume of data to be sent. For example, for each region, a region indicator and the associated region motion phase could only be sent.

For example, during segmentation, the blocks which belonged to a given region during segmentation of the previous field may be preselected. A check is performed to see whether the block motion phases for the preselected blocks reveal a dominant motion phase. In such case, the blocks in the region remain unchanged and the dominant motion phase is assigned to the region as the block motion phase.

It is advantageous to perform the segmentation step using at least one region motion phase value obtained for the previous field. In fact, one may expect that for a given region there is a corresponding conversion: video mode, etc. In this manner one may use the previous region motion phase of a region and the block motion phase of a block of pixels to determine whether the block belongs to the region. It is advantageous to use both the previous segmentation and the previous region motion phase(s) to perform the segmentation, but the process is not limited to this.

It is advantageous to use multiple region motion phases obtained in multiple fields. In this manner it may be known with relative certainty which motion phase(s) to expect for the blocks in the region.

In general, the process is not limited by the manner in which the segmentation is done, as long as the segmentation involves block motion phases.

It is advantageous to update a region history for at least one region, using the region motion phase assigned to the region. For example, this history may comprise a history of region motion phases, or may derive region motion phases from a history. The history is searched for a cadence pattern.

Therefore, the cadence detection is region-based. The method therefore requires relatively few resources for detection. For example, there may be a set of cadence detection registers for each region, and not for each block as in the prior art.

Alternatively, for each block one may maintain a history and perform a pattern search, using any detected conversions for the segmentation into regions.

The use of one or more previous region motion phases for segmentation or for updating the histories is not linked to the use of the previous segmentation in the segmentation of the current field. For example, one may perform the segmentation without using the fact that a given block belonged to a given region in the previous field, then may compare the regions obtained in this manner for the current field to the regions of the previous field. If a region is sufficiently close to a previous region, then the region motion phases of the previous region may be used to continue the segmentation or to update a history of region motion phases for the region.

In a second aspect, a cadence detection device is presented for detecting the cadence of a sequence of images, comprising a pixel motion phase detector arranged to compare the pixels in a group of pixels in each current field in the sequence of images to at least one pixel in at least one previous field, and to assign to each pixel in the group of pixels in the current field a pixel motion phase value as a function of the result of said at least one comparison. Block-based statistical filtering means allow, for each block of pixels in a group of pixel blocks in the current field, determining a block motion phase value from the pixel motion phase values for said block. A segmentation unit is used to segment the current field into at least one region, as a function of at least the determined block motion phase values. A means of calculation assigns a region motion phase value to each region, based on the block motion phase values for the blocks in said region.

The cadence detection device implements the method according to the first aspect. The segmentation into regions enables relatively fast communication between the detection device and a third device, for example, a compression device.

Advantageously, a region map memory, for storing the parameters of at least one region obtained during a segmentation performed on a previous field, is connected to the segmentation unit. The segmentation is therefore performed using a segmentation performed for a previous field.

One may advantageously provide, for at least one region, updating means for updating a history of the region and searching means for searching the history for a cadence pattern.

In a third aspect, a processing system for processing a sequence of images comprises a cadence detection device according to the second aspect, and a processing device connected to the cadence detection device. The processing device uses results obtained by the cadence detection device to perform processing on the fields, for example, deinterlacing or compression.

In a fourth aspect, a television set incorporates a processing system according to the third aspect.

In a fifth aspect, a digital television decoder ("set top box") incorporates a processing system according to the third aspect.

Of course, the processing system may alternatively be incorporated into other devices.

BRIEF DESCRIPTION OF THE DRAWINGS

Other features and advantages will become apparent upon reading the description that follows the description hereinbelow of a non-limiting exemplary embodiment(s), making reference to the appended drawings, in which.

DETAILED DESCRIPTION OF THE DRAWINGS

Deinterlacing System

Figure 1:
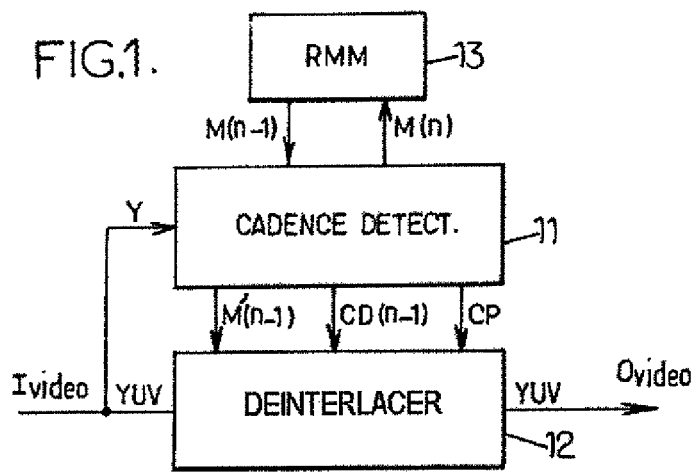
FIG. 1 schematically shows an example of a processing system according to an embodiment.

FIG. 1 schematically shows a processing system for processing a sequence of images, here a deinterlacing system, according to one embodiment of the invention. In the embodiment illustrated, a cadence detector 11 is coupled with a deinterlacing device 12. Of course, the cadence detector of the invention may be used in other applications. For example, the cadence detector may be connected to a compression device to allow detection of redundant fields and therefore contribute to an efficient compression.

In the embodiment illustrated, only the luminance pixels (luma pixels) Y of a video input Ivideo are used by the cadence detector 11. Alternatively, a more complex and more reliable motion detection could be implemented on the basis of comparisons of chrominance pixels (chroma pixels).

A region map memory 13 or RMM is provided for storing a previous segmentation into regions. The fields are subdivided into blocks of 16×8 pixels, meaning that the corresponding images are broken apart into blocks of 16×16 pixels. The RMM 13 stores indications of whether each block in a previous field belongs to a certain region. These indications are used during the segmentation into regions.

The conventional compression format is 16×16 pixels, so the user is accustomed to seeing artifacts appear at the boundaries of blocks of this size. In addition, zones originating from different sources often have the same boundaries as this conventional subdivision into blocks of 16×16 pixels. This limits the number of blocks which overlap multiple zones. Of course, the concepts of operation disclosed herein are not limited by the size of the blocks.

A region map obtained for the previous field M'(n−1) may be sent to the deinterlacer 12, as well as other data, for example, any detected cadence pattern (CP) for a region and status data (or CD(n−1), where CD stands for "cadence data").

Cadence Detector

Figure 2:
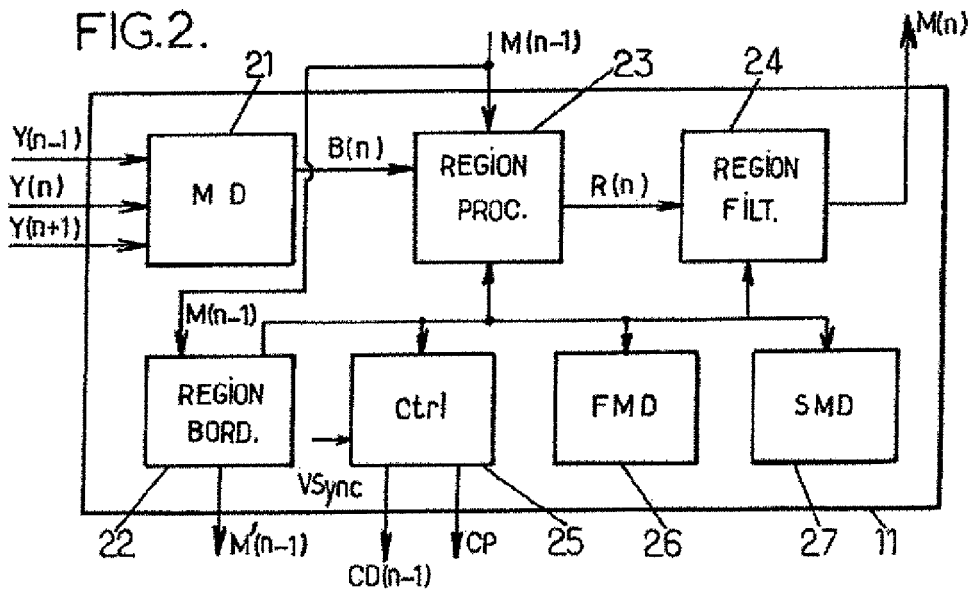
FIG. 2 schematically shows in more detail the cadence detector illustrated in FIG. 1.

FIG. 2 schematically shows in more detail the cadence detector illustrated in FIG. 1. The cadence detector 11 comprises a motion detector 21 or MD receiving as input the current Y(n), previous Y(n−1), and next Y(n+1) luminance fields. The motion detector 21 determines a block motion phase B(n) for each block in the current field. A region processor 23 uses the block motion phases B(n) received from the motion detector 21, as well as the previous segmentation M(n−1) received from the region map memory (labeled 13 in FIG. 1), to perform a segmentation of the field into regions. In addition, a film mode detector 26 or FMD searches for cadence patterns in the histories of region motion phases. This search is conducted at the regional level (region-based). A still mode detector 27 or SMD is also region-based.

The region processor 23, the FMD 26, and the SMD 27 may use shared data. These data are stored in the shared control and status registers of a control unit 25. These are double-buffered registers and are synchronized to a vertical synchronization signal VSync. Thus one may update a register during the processing of the current field n and simultaneously use the value of this register for the previous field n−1.

The segmentation algorithm may, for example, start from the previously obtained regions by using the information stored in the RMM 13. Then it examines whether each block in a previous region still belongs to the region by using, in addition to the block motion phase for the block, a history of the region stored in the control unit 25 and any detected cadence pattern detected by the FMD 26 for the region. The previous region motion phases are used in this manner to eliminate blocks in the region where applicable.

Status data stored in the control unit 25 may also be used in the segmentation algorithm. For example, if the same pattern and the same phase are detected for two separate regions, a flag may be set which causes a merging of the two regions during the next segmentation. The regions accordingly decrease in size by progressively losing blocks, through erosion, and increase in size in incremental steps, through merges.

A region filter 24 filters the regions R(k,n) obtained by segmentation, where k indicates the regions, prior to storage in the region map memory (labeled 13 in FIG. 1). For example, if blocks belonging to the same region surround a block which does not belong to this region, the surrounded block is considered as belonging to the region. This filtering yields more homogeneous regions and reinforces the immunity to noise.

Regions identified as resulting from a conversion from a format other than video format, for example a film format, are to be deinterlaced by a simple field merging. If such a merging was applied to pixels captured in a video format, it would leave artifacts known as the "comb effect". Therefore, a border processing means 22 is provided in order to surround each video region in the previous field with a border composed of delimiting blocks. The modified segmentation thus obtained M'(n−1) as output from the border processing means 22 is sent to the deinterlacing device (12 in FIG. 1).

Motion Detector

Figure 3:
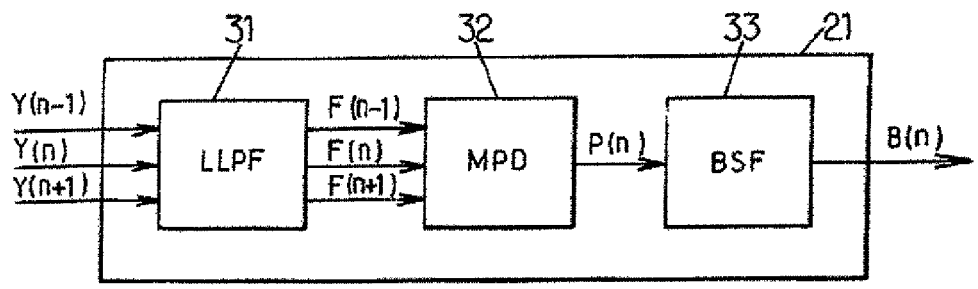
FIG. 3 schematically shows in more detail the motion detector represented in FIG. 2.

FIG. 3 schematically shows in more detail the motion detector represented in FIG. 2. The motion detector uses field comparisons. However, even with identical fields, the measured differences could be non-zero due to noise. Therefore, a motion detector capable of operating with signals that have multiple levels rather than simple binary signals is used. In other words, it is preferable to work with motion probabilities rather than with a simple indication of the presence or absence of motion. In addition, in order to reduce the number of detection errors in zones without motion, the first stage 31 of the motion detector 21 may comprise a low-pass filter (not represented) for the luminance pixels or LLPF (luma low-pass filter).

For example, for each luminance pixel, an average of the pixels surrounding this pixel may be calculated using the formula:

$$F(x, y, n) = \frac{1}{8} \sum_{i=-1}^{1} \sum_{j=-1}^{1} Y(x+i, y+2j, n) \times K(i, j),$$

y mod 2 = n mod 2

Wherein

Y(x,y,n) indicates the value of the luminance pixel located in column x and row y in field n, K(i,j) is a function equal to 1 except when i=0 and j=0 where K(0,0)=0, and F(x,y,n) indicates the filtered value of the luminance pixel located in column x and row y in field n.

Figure 4:
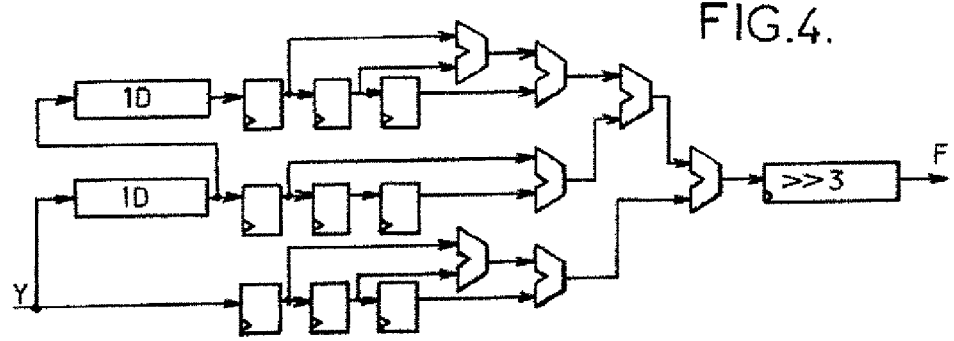
FIG. 4 schematically shows an example of a low-pass filter to be used in a first step in the motion detector represented in FIG. 3.

FIG. 4 shows a exemplary implementation of this filtering. This device comprises such elements as two delay elements for a line, seven adders, and one shift register as represented in FIG. 4. This filtering may also be done for the previous and next fields, such that three filtered fields F(n−1), F(n), F(n+1) are obtained as output from the LLPF 31.

The motion detector 21 additionally comprises a second stage 32 which is a pixel motion phase detector or MPD. The MPD 32 assigns to each pixel a pixel motion phase P(n) based on comparisons of luminance pixels in the filtered fields F(n−1), F(n), F(n+1) issuing from the first stage 31. Its operation is detailed later in this document.

The motion detector 21 additionally comprises a third stage 33 which is a block statistical filter, or BSF. The BSF 33 determines for each block a block motion phase B(n) from the pixel motion phases P(n) of said block. For this purpose, the BSF 33 performs a statistical filtering of the pixel phases P(n). Thus, the BSF chooses as the block motion phase of a given block the most prevalent pixel motion phase for the block. There is a resulting thinning out or subsampling of the motion phase both vertically and horizontally. The operation of the BSF is detailed later in this document.

Pixel Motion Phase Detector

FIGS. 5A to 5E, 6A to 6E, 7, and 8A to 8D describe in more detail the operation of the second stage 32.

Figure 5A:
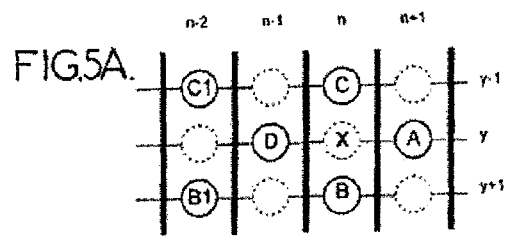
FIG. 5A shows an example of a field sequence derived from frames captured in video format.
Figure 5B:
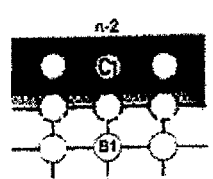
FIGS. 5B to 5E show examples of images corresponding to the fields in FIG. 5A.
Figure 5C:
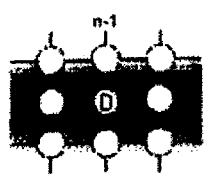
Figure 5D:
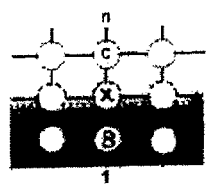
Figure 5E:
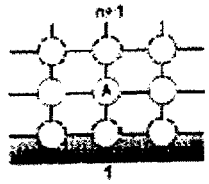
Figure 6A:
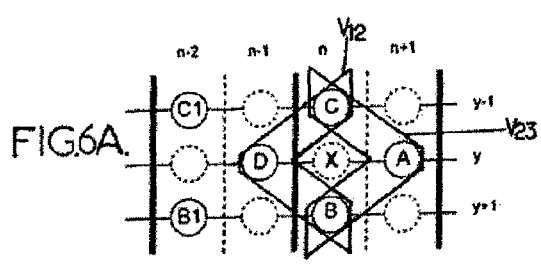
FIG. 6A shows an example of a field sequence derived from frames captured in film format.
Figure 6B:
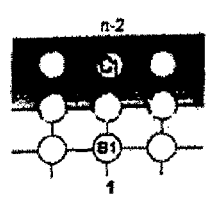
FIGS. 6B to 6E show examples of images corresponding to the fields in FIG. 6A.

FIGS. 5A and 6A show, for a pixel X(x,y) belonging to a column of index x and a row of index y, examples of field sequences of index n. The pixels represented with dotted outlines are the pixels belonging to the missing rows, meaning the pixels whose values must be interpolated. The thick lines between two fields indicate that these two fields originate from different frames. In other words, it is possible for motion to be detected between these fields.

FIGS. 5A to 5E concern a sequence of fields derived from frames captured in a video format, for example of 50 frames per second. We will use the term video mode. Let us assume that the captured frames represent a thin, dark horizontal bar which is animated to move in a vertical direction from the top to the bottom over a light background at the apparent speed of 1 row per field, as is shown in FIGS. 5B to 5E. Each of these FIGURES respectively illustrates one of the fields n−2, n−1, n and n+1. As each field originates from a different frame, FIGS. 5B to 5E show a progressive displacement from one FIGURE to the next.

FIGS. 6A to 6E relate to a sequence of fields originating from frames captured in a film format, of 25 frames per second for example. A 2:2 pulldown was applied in order to display these data in PAL format. In other words, each frame in the film format was scanned to two successive interlaced fields, to allow a transmission of 50 fields per second. For the same filmed object as shown in FIGS. 5A to 5E, meaning a thin, horizontal bar which is animated to move in a vertical direction at the apparent speed of 1 row per field, FIGS. 6A to 6E each respectively illustrating one of the fields n−2, n−1, n and n+1, show a relatively jerky motion. In fact, there is zero displacement between fields originating from the same frame filmed at a given moment.

For each pixel located at a position (x,y) in a field n, motion metrics $M13(x,y,n)$, $M12(x,y,n)$ and $M23(x,y,n)$ are calculated by the MPD (labeled 32 in FIG. 3). For clarity, the values of the luminance pixels F(x,y,n+1), F(x,y+1,n), F(x,y−1,n) and F(x,y,n−1) on the basis of which the comparisons between fields are made will respectively be called A(x,y,n), B(x,y,n), C(x,y,n) and D(x,y,n).

The motion metrics $M13(x,y,n)$, $M12(x,y,n)$ and $M23(x,y,n)$ are calculated using the following formulae:

$$M13(x,y,n)=|A(x,y,n)-D(x,y,n)|$$

$$M12(x,y,n)=|D(x,y,n)-\text{MEDIAN}(D(x,y,n),B(x,y,n),C(x,y,n))|$$

$$M23(x,y,n)=|A(x,y,n)-\text{MEDIAN}(A(x,y,n),B(x,y,n),C(x,y,n))|$$

Decision rules are then applied to assign a motion phase P(x,y,n) to a pixel located at a position (x,y) in a field n. For example, the following rules may be applied:

a film motion phase is detectable at position (x,y) in field n if $$M13(x,y,n)>t\_move \text{ and } |M12(x,y,n)-M23(x,y,n)|>t\_cfd$$

if a film motion phase is detectable, a film motion phase is detected if $$M12(x,y,n)>M23(x,y,n),$$

if a film motion phase is detectable, a film still picture phase is detected if $$M12(x,y,n)<M23(x,y,n),$$

a video motion phase is detected if the following conditions are met:

$$M13(x,y,n)>t\_move \text{ and } |M12(x,y,n)-M23(x,y,n)|\leq t\_cfd; \text{ and}$$

$$M12(x,y,n)>t\_move, \text{ and}$$

$$M23(x,y,n)>t\_move.$$

The thresholds t_move and t_cfd respectively represent a motion threshold and a consecutive field difference threshold.

Figure 7:
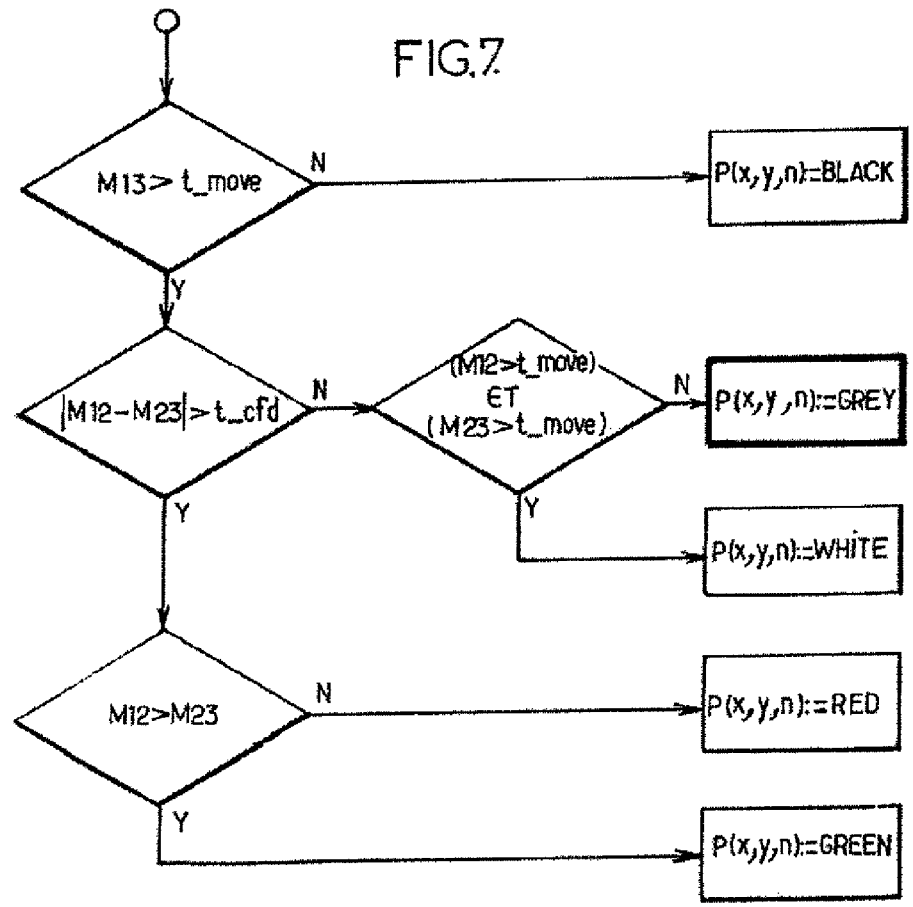
FIG. 7 is an example of an algorithm which is likely to be executed by a pixel motion phase detection step of the motion detector represented in FIG. 3.

FIG. 7 shows an example of an algorithm which could be implemented by the MPD 32. This algorithm applies the decision rules described above. A pixel is associated with a color to reflect what motion phase is detected. Black corresponds to a still picture, green to a film motion phase, red to a film still picture phase, white to a video motion phase, and grey to undetermined. Thus, unless there is a change of scene, most of the pixels have a motion phase corresponding to the color black. It is often only at the edges of moving objects that motion may be detected.

For example, a moving arm is filmed in a film format of 25 frames per second. The resulting images undergo a 2:2 pulldown, meaning each frame is broken apart into a first field and a second field. For each first field, the MPD assigns the color green to the zones of pixels corresponding to the outlines of the arm. Because the first field does not come from the same frame in the film format as the previous field, a film motion phase is detected for these pixels. However, each second field normally comes from the same frame in film format as the previous field (the first field). For each second field, the MPD therefore assigns the color red to essentially these zones of pixels corresponding to the outlines of the arm, signifying the detection of a conversion from film format and an absence of motion since the previous field. When the MPD processes such a sequence, green zones and red zones alternate with each other.

For pixels originating from images in video format, for example text in a subtitle, the motion phase detection might not reveal zones of moving contours so clearly. In particular, the pixels in zones actually in motion may easily be associated with an entire palette of colors corresponding to the detected phases, such that these zones are colored by the MPD in a non-uniform manner.

In the case of the 2:2 pulldown illustrated in FIGS. 6A to 6E, the metric M23($x,y,n$) calculated for pixel X($x,y,n$) or F($x,y,n$) is illustrated by the V shape V23 in FIG. 6A. The metric M12($x,y,n$) is illustrated by the V shape V12. If the base of one of the V shapes contrasts with the two arms of the V shape, then the corresponding metric is raised.

Figure 6C:
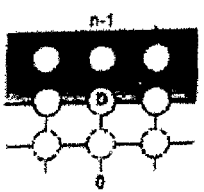
Figure 6D:
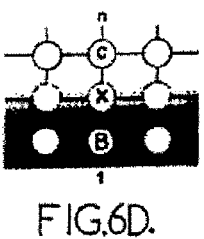
Figure 6E:
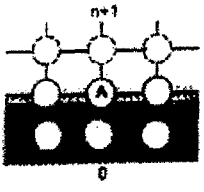
Figures 8A, 8B, 8C, 8D:
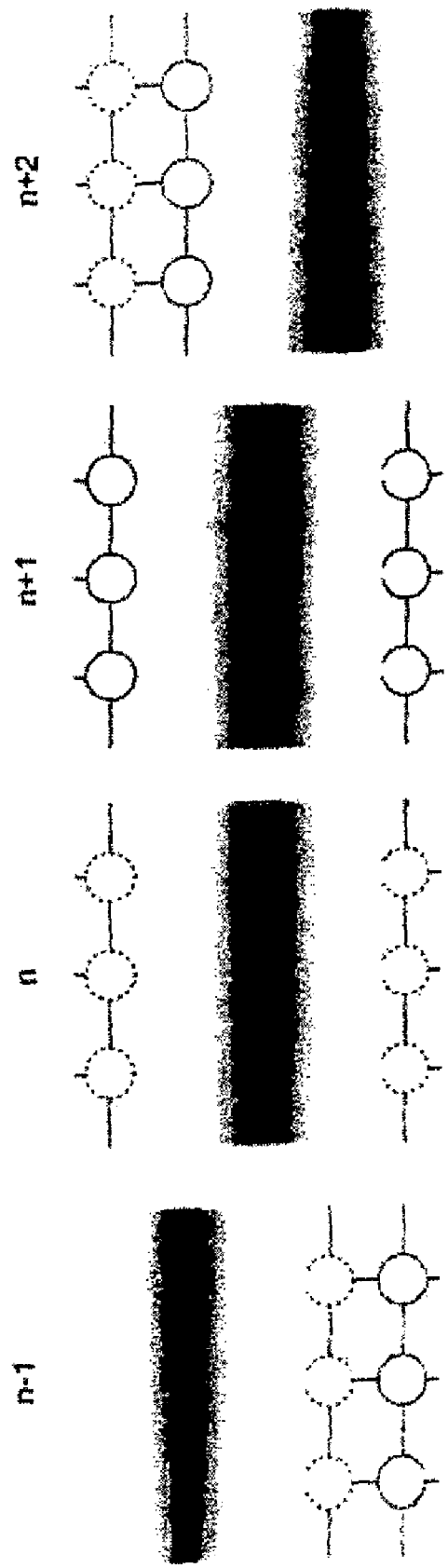
FIGS. 8A to 8D show other examples of images corresponding to a field sequence derived from frames captured in film format.

Referring to FIGS. 6C and 6E, it is apparent that M13($x,y,n$) is relatively low because pixels A($x,y,n$) and D($x,y,n$) have relatively close values. There is therefore a risk that motion is not detectable for pixel X($x,y,n$).

In the case of the motion of a thin horizontal bar which is twice as slow, as represented in FIGS. 8A to 8D, the metric M13 may have a relatively high value, and there is a chance that the metric M12 is less than the metric M23. Thus, there is a risk of detecting a film still picture phase for the field n (color red), whereas in actuality the field n corresponds to a film motion phase (color green).

These examples show that the risk of a detection error at the pixel level may be relatively high, particularly for thin and relatively slowly moving objects. However, a good number of filmed objects have dimensions much larger than a pixel and move at apparent speeds which are greater than two lines per field.

In addition, the LLPF filter (31 in FIG. 3) contributes to decreasing the probability of a false detection by lowering the contrast of thin structures. In addition to this filtering at input, there may be a parallel adjustment of the values of the thresholds t_move, t_cfd, and of the block statistical filtering parameters of the BSF (33 in FIG. 3). These values may also be made to vary as a function of an estimate of the image contrast and noise. Thus, if the contrast is low for the objects, the threshold values t_move, t_cfd, and the block statistical filtering parameters of the BSF 33 may be relatively low. Motion is thus detectable even for relatively low values of metrics or differences in metrics. These values may also be made to vary as a function of the size of the luminance values (8 bits or 10 bits).

Block Statistical Filter

Once the pixel motion phase P(x, y, n) is determined for each pixel in a field, statistical filtering is applied to determine the block motion phases B(i, j, n), where i and j indicate the position of each block. The BSF (33 in FIG. 3) is provided for this purpose.

Statistics are calculated for each block from the 16×8 pixel motion phases P(x,y,n) for the pixels in the block. For each color, the number of pixels in the block to which the color was assigned is counted:

$$\text{COLOR}(i, j, n) = \sum_{block} \text{ONE}(x, y, n, c),$$

wherein:

c represents a color, for example green, and

ONE($x,y,n,c$)=1 if P($x,y,n$)=c

Also counted are the number of pixels in the block to which a non-black color was assigned, meaning the pixels for which motion was detected:

$$\text{GROUP}(i, j, n) = \sum_{c \neq black} \sum_{block} \text{ONE}(x, y, n, c)$$

Figure 9:
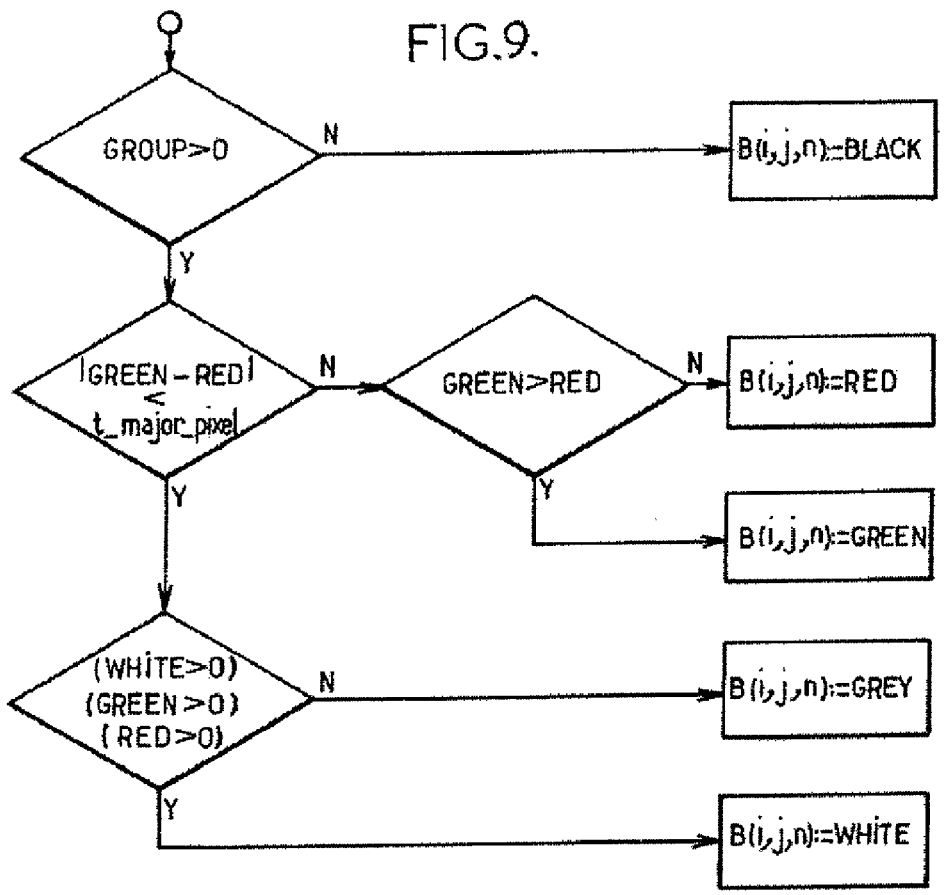
FIG. 9 is an example of an algorithm which could be executed by a block-based statistical filtering step of the motion detector represented in FIG. 3.

The values of the COLOR(i,j,n) and GROUP(i,j,n) variables are used to select a color for the block, or in other words a block motion phase B(i,j,n), using the algorithm in FIG. 9, for example.

The threshold t_major_pixel is used to decide whether one of the colors red or green clearly predominates over the other. In other words, this threshold is used to associate with the block a film-type block motion phase. The value of this threshold may be determined empirically.

Segmentation into Regions

Returning to FIG. 2, the block motion phases for block B(n) determined by the motion detector 21 are sent to the region processor 23 of the cadence detector 11.

Figure 10:
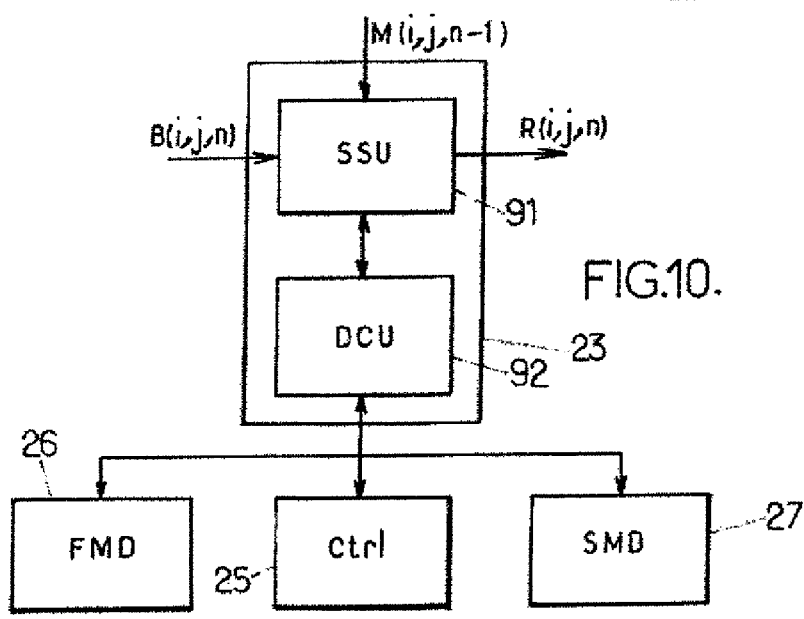
FIG. 10 schematically shows in more detail a part of the cadence detector represented in FIG. 2.

FIG. 10 schematically shows a part of the cadence detector 11 in more detail: the region processor 23, the film mode detector 26 or FMD, the still mode detector 27 or SMD, and the control unit 25. The region processor 23 comprises a statistics and segmentation unit 91 or SSU and a detection control unit 92 or DCU. The SSU 91 performs a segmentation into regions, for example using an algorithm as described below. The DCU 92 supervises the cadence detection for each region, using the FMD 26. The still mode detector SMD 27 indicates which regions only contain still pictures.

A region is formed of parts of an image considered as presenting the same cadence and the same phase. The segmentation may involve a mask-based representation, with each mask containing the blocks of a corresponding region. Each mask may be stored in the region map memory (labeled 13 in FIG. 1) in the form of a block-based bitmap, in which each block is represented by a bit set to "0" or "1", with "1" signifying that the corresponding block belongs to the region.

Figure 11:
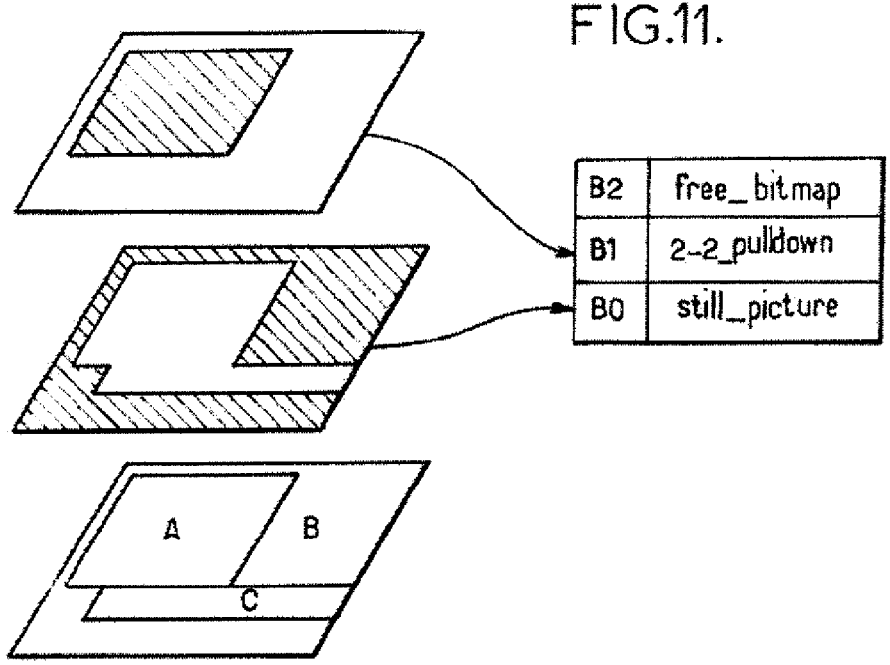
FIG. 11 shows an example of layering multiple masks for a given image.

FIG. 11 shows an example of such a layering of masks for an image comprising zones A, B, C originating from different sources. The still_picture mask formed by the bits B0($i,j,n$) corresponds to the region B which contains no motion. The 2-2_pulldown mask formed by the bits B1($i,j,n$) corresponds to the region A presenting a 2:2 pulldown. The free_bitmap mask formed by the bits B2($i,j,n$) is so called because it corresponds to an unidentified cadence.

When all the bits B0, B1, B2 of a given block are "0", the block is said to be a "free block". A block from a video source in zone C may present a bit B2 which is "0" or "1". The bit B2 is set to "1" when the free block is captured in the free_bitmap mask. The conditions for capturing or releasing a block will be detailed later in this document.

Whether a block belongs a given mask is therefore represented by the values of the three bits B0, B1, B2 for the block. With this "one-shot" encoding technique, only one of the bits B0, B1 or B2 may assume the value of "1" for a given block. Alternatively, one may use a two-bit binary code for each block to index up to four masks. It is also advantageous to use an image encoding technique to compress the region map. An example of such a technique is RLE (Run-Level Encoding).

The size of the region map memory (labeled 13 in FIG. 1) is determined by the encoding technique, the maximum number of regions, the size of the blocks, and the image resolution.

There may also be an additional bit break_bit for each block, which is set to "1" when the block is not in phase with the cadence previously detected for the region to which this block seemingly belongs.

Statistics and Segmentation Unit

The statistics and segmentation unit 91 performs a recursive segmentation based on the cadence. Initially, all the blocks are free, meaning the masks are empty. After a first field is processed, all the blocks are captured in the free bitmap mask.

Figure 12:
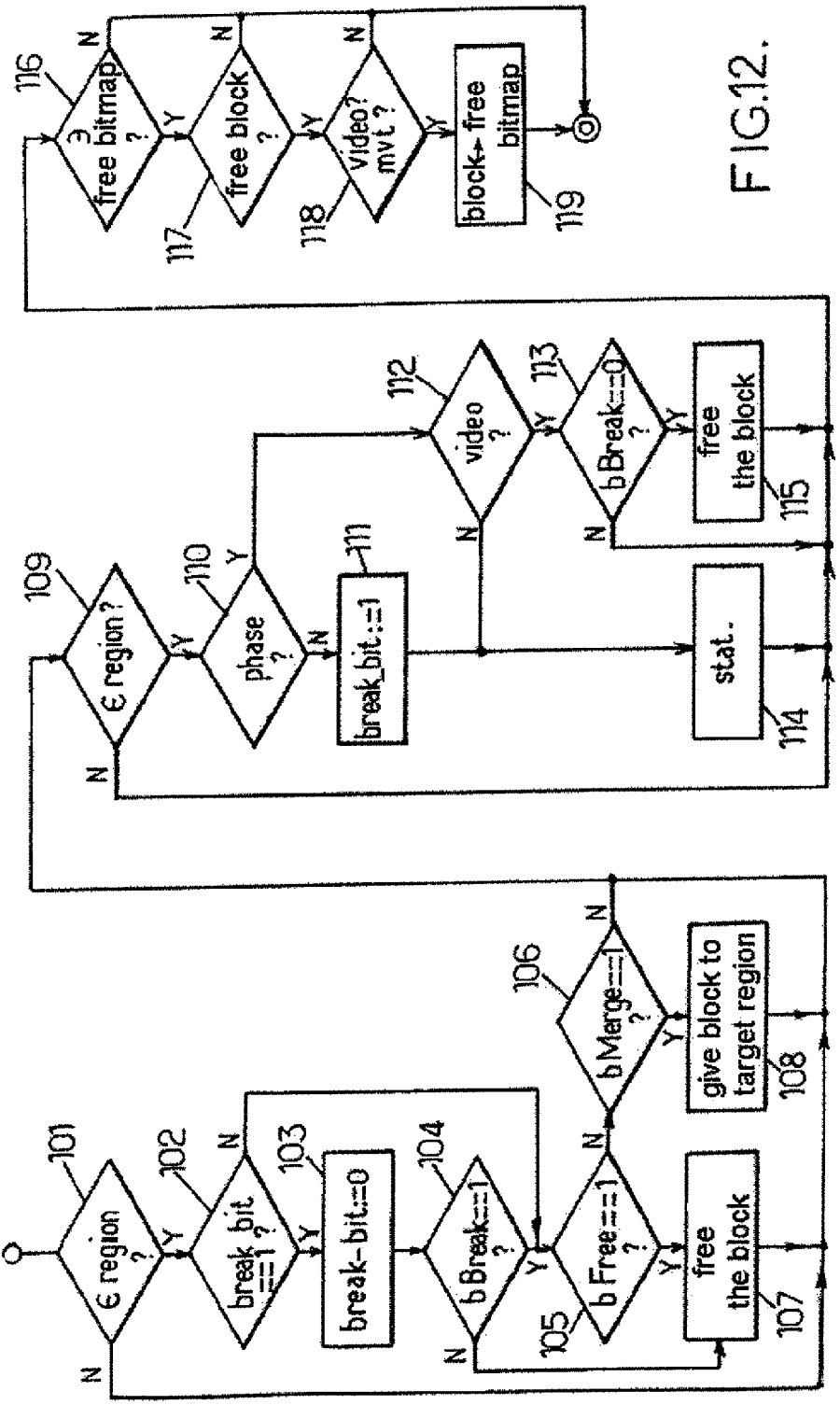
FIG. 12 is an example of a segmentation algorithm which could be implemented by the statistics and segmentation unit represented in FIG. 10.

FIG. 12 is an example of a segmentation algorithm applicable to each block in a field n. For each block, the corresponding block motion phase B(i,j,n) is used, as well as a previous segmentation, to determine the current regions R(i,j,n). For example, one may use a previous region map M(i,j,n−1). A test 101 is applied, to the bits of the masks in the previous region map M(i,j, n−1) for example, to determine whether the block corresponding to the bits belongs to one of the masks.

In such case, a test 102 is also applied to the value of the break_bit bit for this block, stored in the RMM, to verify that the block was in phase with the rest of the region for the previous field n−1. If not, several test steps detailed below are performed before freeing the block (step 107).

If the break_bit bit is "1", the break_bit bit is first reset to zero (step 103), then an index for the mask to which the block belongs is used to address a set of registers corresponding to this mask and in which the region flags are stored. The value of a break flag for the region called bBreak is tested (step 104). This flag is "1" if a cadence break was previously detected for field n−1. Such a value of the region flag indicates scene editing, and it would be undesirable to delete the region by releasing its blocks one by one. It would be preferable to release all the blocks in the region simultaneously in such a case.

If the region flag bBreak is "0", the block is immediately freed (step 107), because it is no longer in phase with the cadence of the region.

If the region flag bBreak is "1", a test (step 105) is applied to the value of a region flag bFree used to indicate that all blocks in the region are to be freed. If the flag bFree is "1", then the block is freed (step 107).

If the bFree flag is "0", a test is applied to the value of another region flag bMerge, used to indicate that two regions are to be merged into a target region presenting the smallest region index, as illustrated by steps 106 and 108.

If the block still belongs to a region (step 109), a step 110 is performed to test whether it is out of phase, using the previous region motion phases. In particular, if a pattern was detected for the region, one may expect a given region motion phase. If the block motion phase B(i,j,n) indicates a video motion (color white) or a film still picture (color red), then a film motion (color green) is expected, or else the block is not in phase with its region. The same is true if the block motion phase B(i,j,n) indicates a film motion (color green) when no motion is expected for the region. If such an out-of-phase issue occurs, the break_bit bit of the block is set to "1" (step 111).

The algorithm comprises a test step 112 in which it is estimated whether the block could have originated from a video source. To do this, it examines whether the block motion phase B(i,j,n) indicates a video motion (color white). In such case, if no specific cadence is detected for the region of this block, then the block is freed (step 115) unless this is a break in the cadence (test step 113).

A region motion phase is determined for each region. Statistics are calculated (step 114) for this purpose, using the following formulae for example:

$$ONE(i,j,n,c)=1 \text{ if } B(i,j,n)=c$$

where c represents a color, for example green, $$COLOR(n) = \sum_{region} ONE(i, j, n, c), \text{ where } c = COLOR,$$

and $$GROUP(n) \sum_{c \neq black} \sum_{region} ONE(i, j, n, c)$$

It is advantageous for step 114 to be performed for blocks not likely to originate from a video source. The lower the number of video blocks, the easier the detection of a film mode.

These statistics are sent to the DCU (labeled 92 in FIG. 10) in order to decide on the motion phase for the region. The algorithm in FIG. 13, detailed below, may be used for this purpose.

When a free bitmap is available (test step 116), a free block is assigned to this mask (step 119) if the motion phase for the block does not indicate video motion or repeated motion ("moving again") (step 118). Repeated motion is considered to be indicated if the voted color for this region in the previous field is white or green, colors indicative of motion, and the motion phase for the block indicates a film motion phase. Step 118 thus avoids assigning blocks to a region which one may assume would not reveal any particular cadence.

Control and Status Registers

The control unit (labeled 25 in FIG. 2) stores a certain number of status registers, usable by the statistics and segmentation unit (labeled 91 in FIG. 10), the detection control unit (labeled 92 in FIG. 10), the FMD (labeled 26 in FIG. 2), and/or the SMD (labeled 27 in FIG. 2). The table below represents these registers:

| Size | Name | Description |
| --- | --- | --- |
| 1 × 40 bits | bStill | 1 if absence of motion detected |
| 1 × 40 bits | bMove | 1 if motion detected |
| 1 × 40 bits | bDetect | 1 if motion is detectable |
| 1 bit | bFilmMode | 1 if film mode |
| 1 bit | bPhotoShot | 1 if film mode currently being detected |
| 1 bit | bBreak | 1 if break in the cadence |
| 1 bit | bMerge | Indicates a coming merge of two regions |
| 1 bit | bFree | 1 if the blocks of a region are to be freed |
| 8 bits | ucPattern | Pattern index |
| 8 bits | ucPhase | Cadence phase index |
| 8 bits | ucCountMiss | Counts the number of misses (non-matches) |
| 32 bits | ulCountBlocks | Counts the number of blocks in a region |
| 5 × 32 bits | ulCountColor | Counts the number of blocks of each color in a region |

Detection Control Unit

Returning to FIG. 10, the DCU 92 controls the region-based cadence detection, using the data sent in step 114 from the algorithm in FIG. 12.

Figure 13:
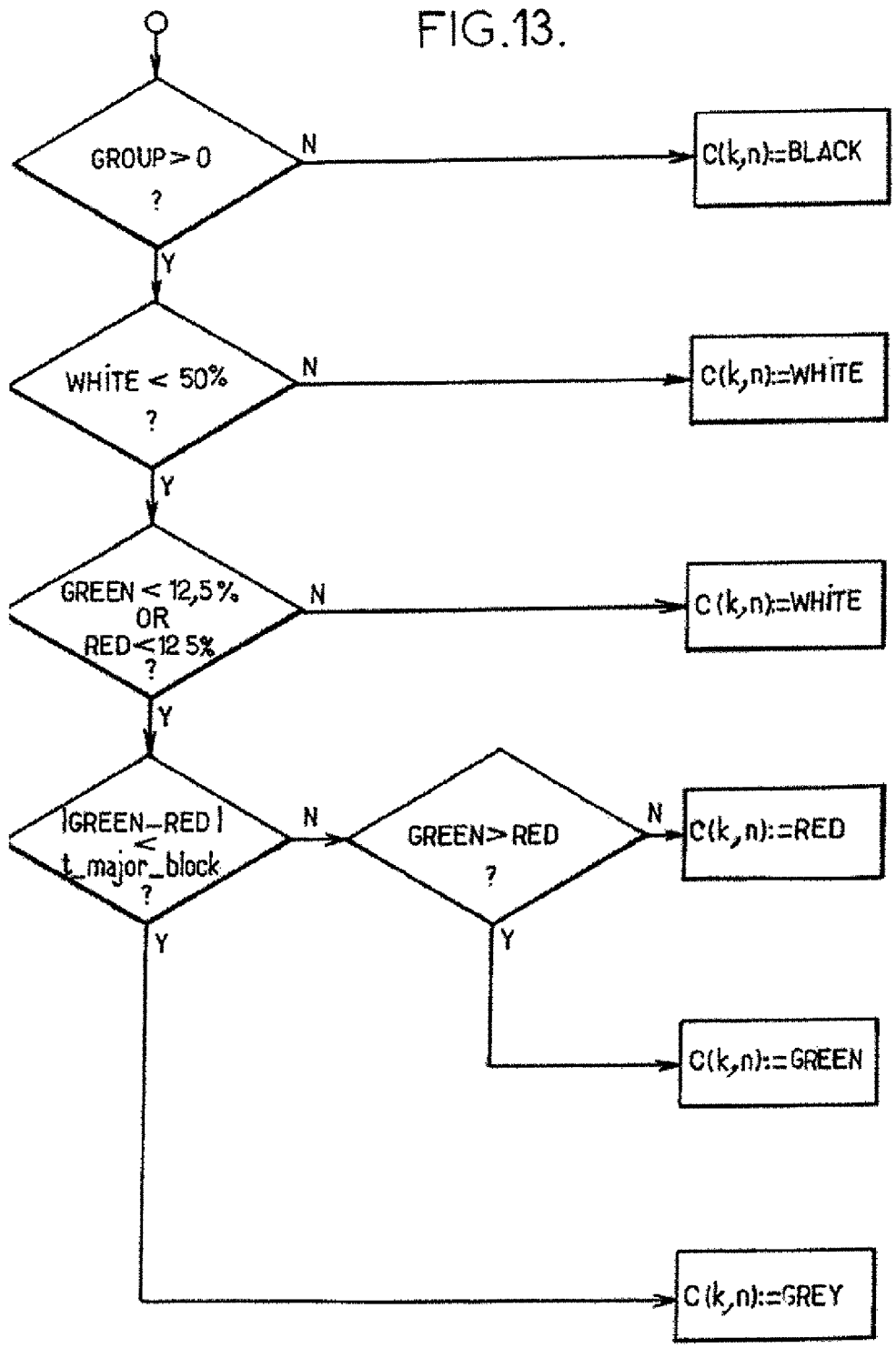
FIG. 13 is an example of an algorithm for calculating statistics in order to assign a region motion phase to each region.
Figure 14:
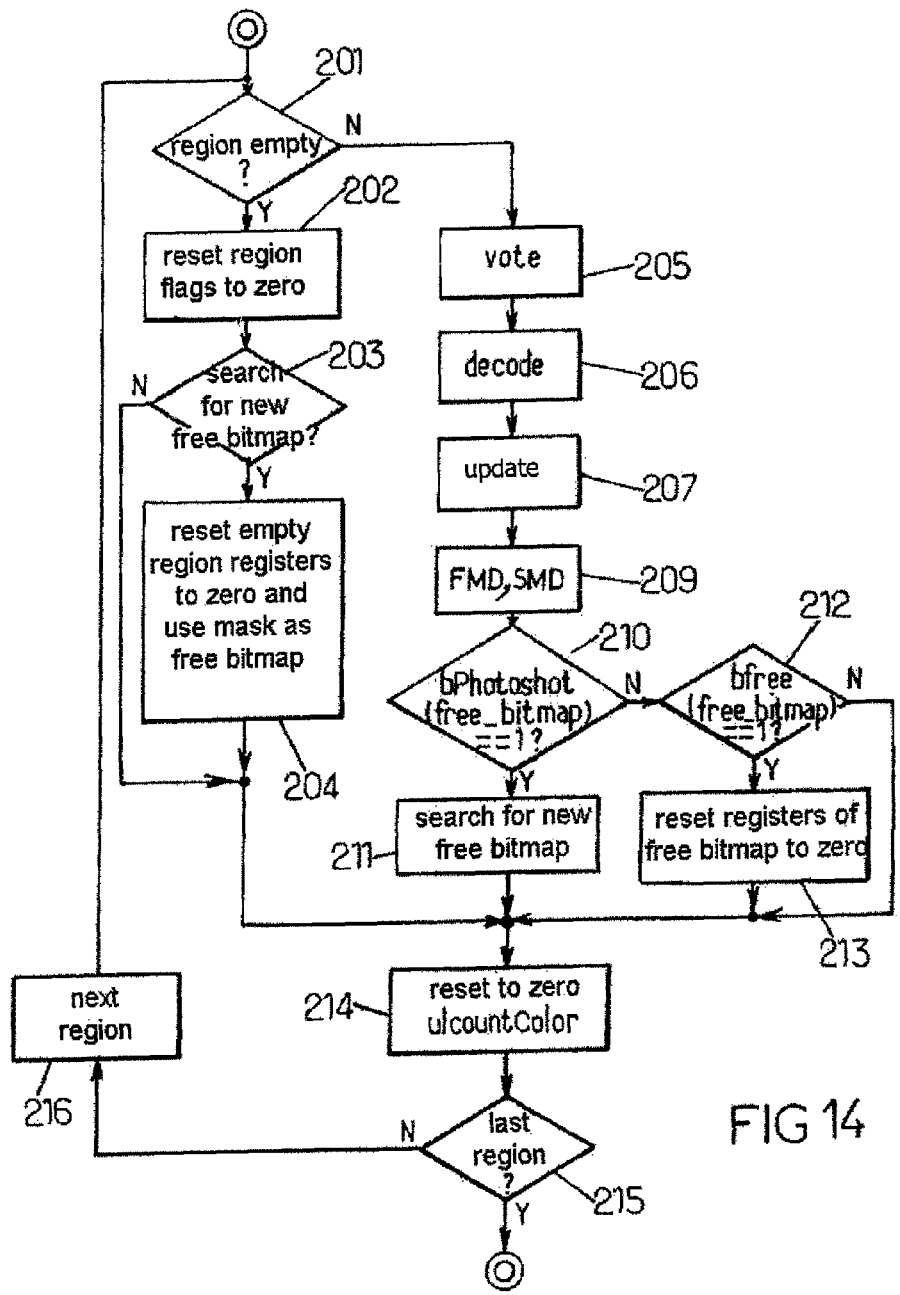
FIG. 14 is an example of an algorithm which could be executed by the detection control unit represented in FIG. 10.

FIG. 14 is an example of a region-based cadence detection algorithm applicable to each field n. For each region, a vote (step 205) is made based on statistics calculated by the SSU (step 114 in FIG. 12), in order to assign a region motion phase C(k,n) to the region, using the algorithm in FIG. 13 for example. The steps of this algorithm are implemented at the region level.

The algorithm in FIG. 13 uses a threshold t_major_block to decide whether one of the colors red or green clearly predominates over the other. In other words, this majority threshold is used to associate a film-type region motion phase with the region. The value of this threshold may be determined empirically.

The predominating motion phase is decoded (step 206 in FIG. 14) into three binary signals Still, Detect and Move. A table of correspondences as shown below may be used:

|        | Black | Grey | Red | Green | White |
|--------|-------|------|-----|-------|-------|
| Still  | 1     | 0    | 0   | 0     | 0     |
| Detect | 0     | 0    | 1   | 1     | 1     |
| Move   | 0     | 0    | 0   | 1     | 1     |

The algorithm also comprises a step 207 for updating the shift registers bStill, bDetect and bMove. These registers are shifted by one position in order to free the space for storing the values of the three signals corresponding to the field n. These registers, 40 bit registers for example, store the history of the region for the last 40 fields. The values of the three decoded signals Still, Detect and Move for the field n are written to the corresponding positions thus freed in the bStill, bDetect and bMove registers.

After these updates, the DCU requests (step 209) the FMD and the SMD to perform a film mode detection and a still mode detection, respectively. These detections are detailed below.

If a film mode is detected, the FMD sets a region flag called bFilmMode to "1".

If it is apparent that a specific cadence is materializing for the region corresponding to the free bitmap, the bPhotoShot region flag is set. The count_hits parameter represents the time between the rising edge of this flag and the rising edge of the bFilmMode flag. When the bPhotoShot flag is set by the FMD, the mask corresponding to this region is no longer used as a free bitmap, meaning it is no longer able to receive new blocks (steps 116 to 119 in FIG. 12). A new free bitmap must be searched for (step 211) after a positive test 210 regarding the value of the bPhotoShot flag for the free bitmap.

If no cadence is found for a region during a number of fields specified by the parameter count_miss, then the region flag bFree is set by the FMD.

If the flag bFree corresponding to the free bitmap is "1" (test 212), the blocks in the corresponding region are not freed. The registers corresponding to this region, including the region flags, are reset to zero, except for a register ulCountBlocks used to count the blocks belonging to the region.

If the bFree flag corresponding to another mask is "1", then the blocks in the corresponding region are freed during the segmentation of the next field n+1 (steps 105 and 107 in FIG. 12). The region is then empty: ulCountBlocks=0.

When a region is empty (step 201), the corresponding region flags are reset to zero (step 202) and if a new free bitmap is being searched for (203), then the registers in the empty region are reset to zero and the mask corresponding to this region is used as the free bitmap (step 204). Note that a region may be emptied on request by setting the corresponding bFree flag, or if all blocks in the region were freed during segmentations (steps 107 and 115 in FIG. 12).

The ulCountColor color statistics registers are reset to zero (step 214) before advancing to another region (steps 215 and 216).

Once all the regions have been processed, the DCU looks to see if certain regions are in phase, in order to perform merging during the segmentation of the next field n+1. The merge algorithm is detailed below with reference to FIG. 17.

Film Mode Detection

The FMD searches for patterns in the bits of one or more 40-bit registers bDetect and bMove.

In fact, for example for a region resulting from a 3:2 pull-down, the corresponding bMove register may comprise "10010" patterns, in addition to "0" values indicating an absence of motion for the region. For a region resulting from a video source, there will probably be no patterns observed as such, but sequences of "1" values. The following table shows a few examples of conversions and the associated patterns:

| Name     | Pattern length | Pattern           | Usage                                                   |
|----------|----------------|-------------------|---------------------------------------------------------|
| "2:2"    | 2              | "10"              | Converting film images                                  |
| "3:2"    | 5              | "10010"           | Converting film images                                  |
| "2:2:2:4"| 10             | "1010101000"      | DVCAM                                                   |
| "2:3:3:2"| 10             | "1010010010"      | DVCAM                                                   |
| "5:5"    | 10             | "1000010000"      | Animation                                               |
| "6:4"    | 10             | "1000001000"      | Animation                                               |
| "3:2:3:2:2"| 12           | "100101001010"    | Accelerated broadcasting to leave more time for advertising |
| "8:7"    | 15             | "100000001000000" | Japanese animation                                      |

The pattern search uses a certain number of registers. For each detectable pattern there may be:

a bPhase register, for example a 20-bit register, for receiving said pattern, for example "10010", a ucLength register, for example an 8-bit register, for storing the length of the pattern, for example 5, and a ucDelay register, for example an 8-bit register, for storing a length parameter used in the detection, for example the length of the cadence bitstreams to which the contents of the bMove register are compared bit by bit.

For each detectable conversion and for each cadence phase, the FMD generates a cadence bitstream, for example the five bitstreams "1001010010 . . . ", "0010100101001 . . . ", "010100101001 . . . ", "101001010010 . . . " and "01001010010 . . . " in the case of a 3:2 pulldown. If one of these bitstreams matches the bitstream stored in the bMove register, then a film cadence is detected. The following logic equation may be used:

$$bHit1 = (bPhase\ AND\ bMove)\ OR\ (NOT(bPhase)\ AND\ NOT(bMove)),$$

where bHit1 is a success bit representing a match at the bit level.

The length of each cadence bitstream is defined in the register ucDelay. However, as long as no cadence has been detected, this length is reduced by the value of the count_hits parameter, so that the bPhotoShot flag may be set before the bFilmMode flag.

A counter ucCountMiss counts the number of fields for which a mismatch is observed between the bMove register and the cadence bitstream corresponding to the desired cadence and cadence phase. When the ucCountMiss counter reaches the number count_miss, the bFree region flag is set in order to free the blocks in the corresponding region.

When, after setting the bPhotoShot flag, all the bits of a bitstream of a length reset to the value defined in the register ucDelay match the bits in the bMove register, the bFilmMode flag is set, a pattern index corresponding to this bitstream is saved in the ucPattern register, and the ucCountMiss counter and the bBreak region flag are reset to zero. The cadence phase corresponding to the bitstream is stored in a ucPhase register so it may be used in the next segmentation for detecting a break in the phase (step 110 in FIG. 12).

Then the cadence is considered to be locked, meaning it is not sufficient for a bHit1 success bit to be zero in order to zero out the bFilmMode flag. A bHit2 bit is utilized as defined below.

When the bFilmMode flag is "1", the cadence pattern index and the cadence phase respectively stored in the ucPattern and ucPhase registers are used to generate the next expected bit bPhase. This expected bit is compared to a detectable motion phase in order to find any break in the cadence. The following logic equation may be used:

$$bHit2 = bHit1 \text{ OR } (bPhase \text{ AND NOT}(bMove)) \quad (1)$$

In other words, even if bHit1=0, if motion is expected and no motion is detected, a mismatch is not detected. A still picture is not considered as constituting a pattern break condition.

Alternatively, it is advantageous to use the following logic equation:

$$bHit2 = bHit1 \text{ OR } (bPhase \text{ AND NOT}(bMove) \text{ AND NOT}(bDetect)) \quad (2)$$

In other words, if the region is associated with a red color when a green color was expected, a mismatch is detected. If the color associated with the region is black or gray, it is considered to be a match.

Equation (2) allows more rapid detection of errors due to scene editing. If the sequence "10010100110010100 . . . " corresponds to a region, with the vertical double bar representing an editor's cut, formula (1) does not result in a mismatch until the third field after the cut. Formula (2) results in a mismatch at the second field after the cut, thus gaining one field. The artifacts introduced by inadequate deinterlacing affect one field less.

If there is a break in the cadence, meaning bHit2=0, the bBreak region flag is set and the bFilmMode flag is reset to zero. Film mode detection begins again, with a pattern search for each cadence phase of each detectable pattern.

Still Mode Detection

The SMD counts the number of successive "1" values in the 40-bit register bStill. When this number reaches the value of the programmable parameter count_still, the corresponding bStillMode region flag is set. The bFree flag is reset to zero to avoid freeing the blocks in this region due to a non-detection of a cadence by the FMD. The bStillMode flag is reset to zero if a "0" is found in the next bits in the bStill register.

Region Filter

Figure 15:
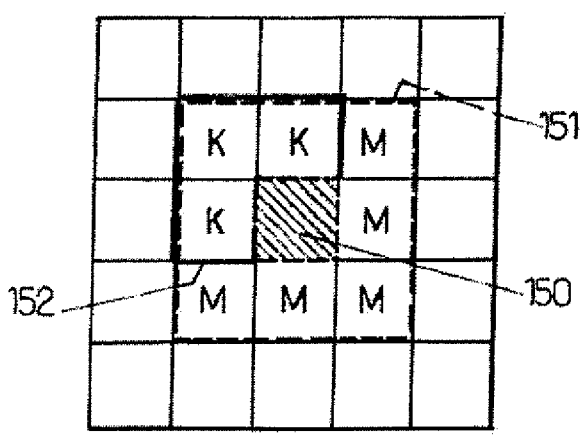
FIG. 15 is a diagram illustrating a region filtering which could be performed by the region filter represented in FIG. 2.

The regions R(k,n) resulting from the segmentation are filtered before they are stored in the region map memory (labeled 13 in FIG. 1). For each block in a region, the region filter (labeled 24 in FIG. 2) uses a surrounding area of $\{3 \times 3\}$ blocks as well as surrounding areas of $\{2 \times 2\}$ blocks, as illustrated in FIG. 15. The label 151 indicates the $\{3 \times 3\}$ surrounding area, delimited by a dotted line, of a block 150. The label 152 indicates one of the $\{2 \times 2\}$ surrounding areas, delimited by a solid line, of the block 150.

The function ONE(i,j,n,k) is calculated, with this function returning a 1 if the block at position i,j for field n belongs to region k, and a 0 otherwise. In particular, for a block at position i,j outside the region k, the function ONE(i,j,n,k) returns a 0.

The function ALL(i,j,n) sums the ONE functions for the blocks in the $\{3 \times 3\}$ surrounding area of a block at position (i,j), for all regions:

$$\text{ALL}(i, j, n) = \sum_k \sum_{(u,v) \in \{3 \times 3\}} \text{ONE}(i+u, j+v, n, k)$$

The function N(i,j,n,k) returns the number of blocks in the $\{3 \times 3\}$ surrounding area which belong to region k:

$$N(i, j, n, k) = \sum_{(u,v) \in \{3 \times 3\}} \text{ONE}(i+u, j+v, n, k)$$

The predominating region in the $\{3 \times 3\}$ surrounding area of a block at position (i,j) of field n is the one with the highest function N(i,j,n,k).

When a block in region k is merged into region m, then the value of M(i,j,n) which is output from the filter is equal to m.

A block at position (i,j) is said to be a region corner if one of the $\{2 \times 2\}$ surrounding areas is formed of blocks not belonging to the region of the block at position (i,j).

Figure 16:
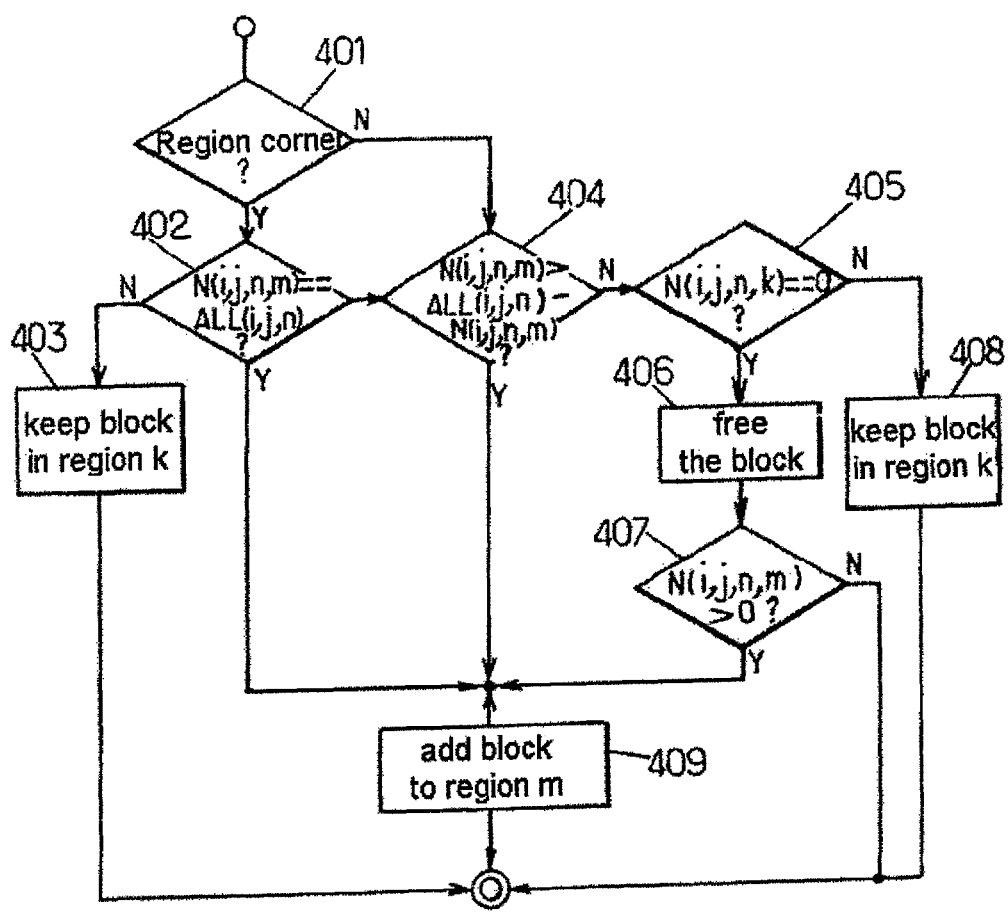
FIG. 16 is an example of an algorithm which could be executed by the region filter in FIG. 2.

The algorithm in FIG. 16 may, for example, be used to perform a filtering by region. This algorithm is applied at the block level.

For a given block, if this block is a region corner (test 401), then the index of region k is kept (step 403), unless the block is isolated among the blocks of another region of index m (test 402), in which case the block is transferred from region k to region m (step 409).

If the block is not a region corner (test 401) and it is surrounded by a predominating region (test 404), then it is added to the predominating region (step 409). If the block is not surrounded by a predominating region (test 404) but it is isolated (test 405), then the block is freed (step 406), and if it is not surrounded by free blocks (test 407) then it is added to a predominating region (step 409). If the block is not isolated (test 405), then it remains in the region (step 408).

Table of Parameters Used

The following table contains a set of parameters used in implementing the embodiment described:

| size | Name | description |
| --- | --- | --- |
| 32 bits | t_move | Pixel motion threshold |
| 32 bits | t_cfd | Pixel motion difference threshold (consecutive field difference) |
| 32 bits | t_major_pixel | Majority threshold for the vote for the predominant block color |
| 32 bits | t_major_block | Majority threshold for the vote for the predominant region color |
| 32 bits | count_hits | Delay between setting the bPhotoShot and bFilmMode flags |
| 32 bits | count_miss | Delay in film mode detection |
| 32 bits | count_still | Delay in the still mode detection |

Merge Algorithm

Figure 17:
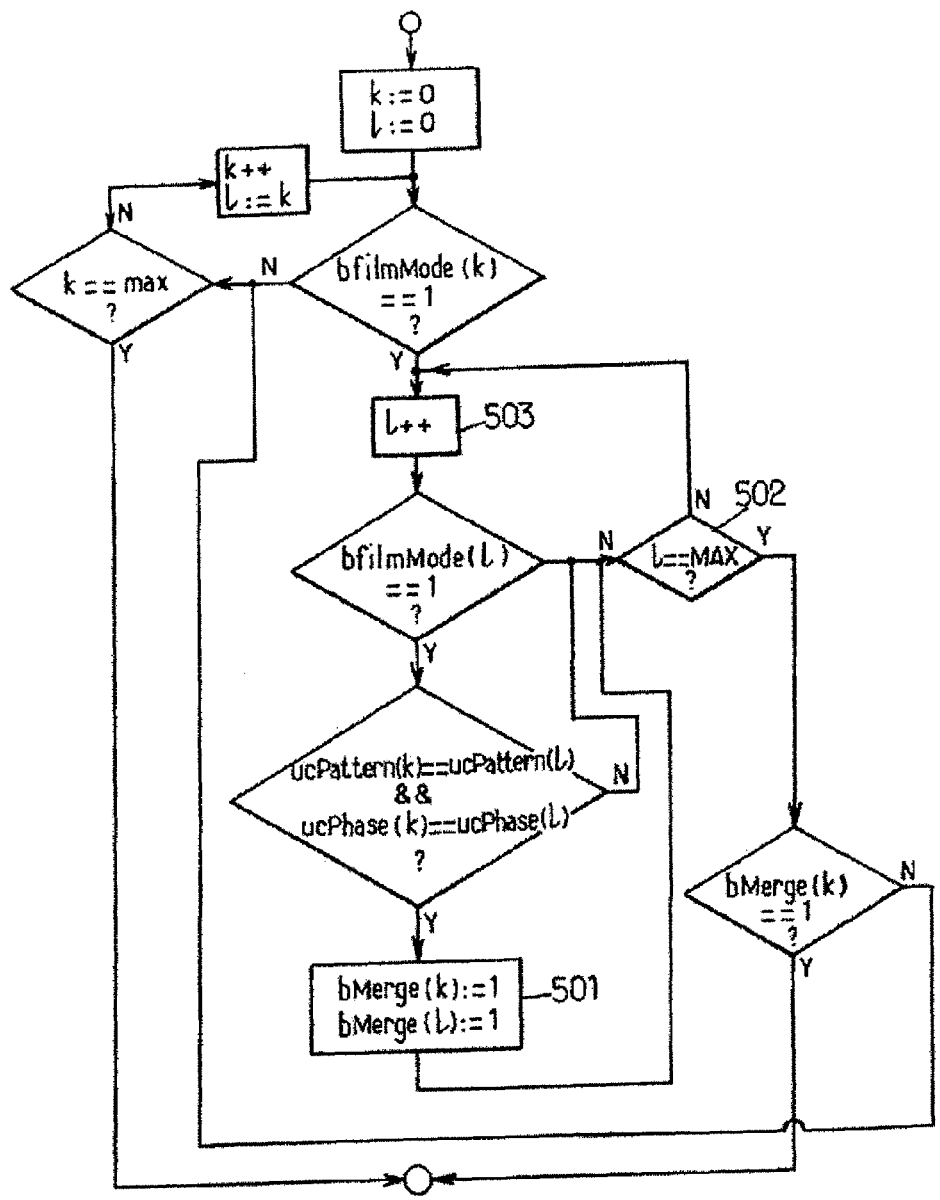
FIG. 17 is an example of a region merging algorithm.

FIG. 17 is an example of a merge algorithm: the regions are scanned using the indexes k, l. If the same cadence and same cadence phase are detected for two separate regions, then the bMerge flags for these regions are set (step 501). It is advantageous after step 501 to continue to iterate through the l indices (steps 502 and 503) to enable merging more than two regions at once.

Although preferred embodiments of the method and apparatus have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method, comprising:
   for each current field in the image sequence, comparing each pixel in a group of pixels in the current field to at least one pixel in at least one previous field;
   assigning to each pixel in the group of pixels in the current field a pixel motion phase value as a function of the result of said at least one comparison;
   for each block of pixels in a group of blocks of pixels in the current field, determining a block motion phase value from the motion phase values of the pixels in said block;
   segmenting the current field into at least one region, where each region comprises a whole number of blocks, as a function of at least the determined block motion phase values; and
   assigning to each region a region motion phase value based on the block motion phase values of the blocks in said region.

2. The method according to claim 1, wherein segmenting is performed using at least one region obtained during a segmentation performed on a previous field.

3. The method according to claim 2, wherein segmenting is performed using at least one region motion phase value obtained for a previous field.

4. The method according to claim 1, additionally comprising:
   for at least one region, updating a history of the region using the value of the region motion phase of said region, and
   searching the history for a cadence pattern.

5. The method according to claim 4, additionally comprising, if a same cadence pattern and a same cadence phase are detected for two separate regions, merging said regions into a single region.

6. The method according to claim 4, comprising detecting a break in the cadence if a film still picture phase is attributed to the region when a film motion phase was expected.

7. A cadence detection device, comprising:
   a pixel motion phase detector configured to compare the pixels of a group of pixels in each current field in the sequence of images to at least one pixel in at least one previous field, and assign to each pixel in the group of pixels in the current field a pixel motion phase value as a function of the result of said at least one comparison;
   a block statistical filter configured, for each block of pixels in a group of blocks of pixels in the current field, to determine a block motion phase value based on the motion phase values for the pixels in said block;
   a segmentation unit configured to segment the current field into at least one region as a function of at least the determined block motion phase values, with each region comprising a whole number of blocks; and
   a calculation unit configured to assign a region motion phase value to each region based on the block motion phase values of the blocks in said region.

8. The cadence detection device according to claim 7, additionally comprising a region map memory configured to store the parameters of at least one region obtained during a segmentation performed on a previous field, with said memory connected to the segmentation unit.

9. The cadence detection device according to claim 8, additionally comprising:
   for at least one region, means for updating a history of the region using the region motion phase value of said region, and
   means for searching the history for a cadence pattern.

10. A processing system for processing a sequence of images, comprising:
    a cadence detection device, comprising:
       a pixel motion phase detector configured to compare the pixels of a group of pixels in each current field in the sequence of images to at least one pixel in at least one previous field, and assign to each pixel in the group of pixels in the current field a pixel motion phase value as a function of the result of said at least one comparison;
       a block statistical filter configured, for each block of pixels in a group of blocks of pixels in the current field, to determine a block motion phase value based on the motion phase values for the pixels in said block;
       a segmentation unit configured to segment the current field into at least one region as a function of at least the determined block motion phase values, with each region comprising a whole number of blocks; and
       a calculation unit configured to assign a region motion phase value to each region based on the block motion phase values of the blocks in said region, and
    a processing device connected to the cadence detection device.

11. The processing system according to claim 10, wherein the processing device comprises a deinterlacing device.

12. The processing system of claim 10 wherein the processing system is a component of a television set.

13. The processing system of claim 10 wherein the processing system is a component of a digital television decoder.

14. The processing system according to claim 10, wherein the cadence detection device further comprises:
    for at least one region, means for updating a history of the region using the region motion phase value of said region, and
    means for searching the history for a cadence pattern.

15. A method for cadence detection, comprising:
    receiving current and previous image fields of a video input, each field being divided into a plurality of blocks;
    determining a block motion phase value for each block in the current image field in comparison to the previous field;
    segmenting each current field into at least one region as a function of the determined block motion phase values, each region including a plurality of blocks;
    assigning to each region a region motion phase value as a function of the block motion phase values of the blocks included within the region;
    assembling from the region motion phase values associated with consecutive image fields of each region a history of region motion phase values for that region; and
    processing the history of region motion phase values for that region to identify cadence patterns in the video input.

16. The method according to claim 15, further comprising, if a same cadence pattern and a same cadence phase are detected for two separate regions, merging said regions into a single region.

17. A cadence detector, comprising:
a motion detector configured to receive current and previous image fields of a video input, each field being divided into a plurality of blocks, the motion detector further configured to determine a block motion phase value for each block in the current image field in comparison to the previous field;
a region processor configured to segment each current field into at least one region as a function of the determined block motion phase values, each region including a plurality of blocks, the region processor further configured to assign to each region a region motion phase value as a function of the block motion phase values of the blocks included within the region, the region motion phase values associated with consecutive image fields of each region being processed to assemble a history of region motion phase values for that region; and
a detector configured to process the history of region motion phase values for that region to identify cadence patterns in the video input and output a signal indicative of same.

* * * * *